United States Patent [19]
Widener

[11] 3,891,960
[45] June 24, 1975

[54] DOPPLER SONAR SYSTEM
[75] Inventor: Maurice W. Widener, Austin, Tex.
[73] Assignee: The United States of America as represented by the Secretary of the Navy, Washington, D.C.
[22] Filed: Feb. 24, 1970
[21] Appl. No.: 15,322

[52] U.S. Cl. .............................. 340/3 R; 340/3 D
[51] Int. Cl. ............................................. G01s 9/66
[58] Field of Search .................... 340/1, 3, 3 D, 6; 343/113 DE

[56] References Cited
UNITED STATES PATENTS
2,399,017  4/1946  Goldman ............................. 340/1
3,121,856  2/1964  Finney ................................. 340/3
3,144,646  8/1964  Breithaupt .................... 343/113 DE Primary Examiner—Richard A. Farley
Attorney, Agent, or Firm—R. S. Sciascia; R. E. O'Neill

[57] ABSTRACT

A system of acoustic echo ranging for the measurement of bearing and range to an underwater object which is in motion toward or away from the detection system located at a selected position. A signal design which results in a very high ability to select only the moving objects and reject any signals which return from the surface or bottom of an ocean, river, or lake.

8 Claims, 4 Drawing Figures

60 KHZ

ANGLE OF MAJOR LOBE

DOPPLER SONAR SYSTEM

Echo ranging, often referred to as sonar, is an old art in the sense that it extends back many years to World War II. Essentially, the concept involved provides a transducer for generating a sound or pressure signal which travels to a target and returns. The elapsed time is directly related to the distance the target is from the transducer. Since sound travels approximately 5,000 feet per second in water, it is a simple matter to time the initiation of the pulse at the transducer and to record the time the sound signal takes to travel to the target and return to the transducer, divide this in two; multiply it by the velocity of a sound in water and the range is obtained. Similarly, the direction to the target is provided by a reading obtained from the bearing the transducer or receiving system is pointed when it receives the signal.

The methods now in use for this type of acoustic signaling are two basic types:

1. continuous transmission and reception without a variation in signal amplitude with time wherein only the Doppler shift of energy is detected; and
2. pulse transmission and reception wherein the time amplitude variations of the signal enable the measurement of range by virtue of the velocity of propagation of the signal through water. In the former system it is practically impossible to determine the distance to a reflector except when a gradually changing frequency is employed and the signal frequency is compared with the echo frequency thus revealing the time displacement of the echo. In the latter system it is practically impossible to determine Doppler shift of frequency with accuracy because of the well known spread of energy all around the frequency of the center of the pulse. In the pulse system it is necessary to turn off the transmitter during reception to avoid interference because of the large difference in signal strength from the outgoing signal to the incoming signals.

The sonar system described in this invention is based on the creation of a signal spectrum that is very closely confined to exact limits prescribed by the design parameters together with the property of amplitude modulation useful in the resolution of range by virtue of propagation time delay. A sonar transducer operating in the water with a fixed frequency input will generate an acoustic wave having a length determined by the velocity of sound in water such that for a frequency of 60 kHz the waves are separated by about 1 inch in salt water. These can be propagated and received at a distant point without any gross changes in frequency by a hydrophone designed for the purpose. If either of the transducers are moved toward or away from the other then the waves are spread or compressed by the Doppler effect on the source or else they are received at a faster or slower rate by the same effect on the receiver. Since frequency may be considered as the rate of change of phase then the transmitted frequency appears to shift by an exact amount determined by the relative velocities of the two transducers. If the transmitter is made up of a collection of sources and is placed in some kind of motion such as rotation about an axis then each source element creates a phase modulation due to its individual motion about the axis. This phase modulation is received collectively by the receiver hydrophone for all elements such that the frequency spectrum is no larger than the limit determined by the elements having the highest relative velocity at any particular time. By organizing the elements into an array with certain desirable properties the total effect of individual signals is to produce a composite signal with a frequency limited spectrum having an amplitude variable exactly described by the steady state polar response of the array rotating on the same axis. The angular characteristics of the array are transformed into the time characteristics of the resulting signal. If a directional hydrophone and receiver are now placed at the transmitter the echoes from reflectors along any selected bearing line are now collected with a delay function determined by the range and propagation time in the water.

The invention disclosed herein is a definite improvement upon old sonar systems which utilizes a new and novel method of obtaining both range and direction of a moving target.

It is an object of this invention to provide an improved sonar system capable of scanning a fixed maximum and minimum range.

It is yet another object of this invention to provide a sonar system capable of selecting between several moving targets of different velocities and tracking individual ones thereof.

It is still another object of this invention to provide an improved moving target echo ranging system comprising;

first, second and third sound transducers rotatable in azimuth and mounted on the same axis, first, second and third means for rotating said sound transducers coupled respectively to said first, second and third sound transducers; an oscillator for generating a substantially pure sine wave at a given frequency coupled to said first sound transducer; a first receiver having first and second receiving channels individually having selected pass bands above and below the generated sine wave signal frequency, the pass bands variable with respect to the generated sine wave signal, the receiver connected to said second sound transducer; a second receiver having third and fourth receiving channels individually having selected pass bands above and below the generated signal, the pass bands variable with respect to the generated signal, the second receiver connected to the third sound transducer; first display means connected to said first receiver and said first rotating means to display the relative bearing azimuth of the reflected signal from the first sound transducer to the target and return to the said second sound transducer; second display means connected to the said second receiver and the said rotating means to display the echo signal strength returning from a moving target along a selected bearing azimuth as a function of the measured time of travel of a wave generated by said first sound transducer along the selected azimuth and the reception of the wave returning to said third sound transducer; means coupled to the rotating means to rotate the first and second antennas with a fixed angular displacement therebetween to receive at the second sound transducer reflected signals from targets between a minimum and maximum distance from the coaxial array; and, means for positioning the third sound transducer on a given bearing towards a moving target coupled to the third rotating means, said target adding or subtracting a frequency component to the generated signal so that the reflected signal is at a higher or lower frequency by an amount relative to the motion of the target, said reflected signal frequency being in the pass band of the first and third or second and fourth receiving channels.

It is yet a further object of this invention to provide a system for acoustical echo ranging capable of measuring bearing and range of the moving target, comprising a first sound transducer rotatable mounted; a second sound transducer rotatable mounted and coaxially aligned on the same axis; a signal source for generating a first substantially pure sine wave signal coupled to the first sound transducer; a means for receiving and amplifying signal echoes of a given frequency range above or below the first signal, said echoes received from a moving target, said means coupled to the second sound transducer, and means for comparing the frequencies of the transmitting signal and the echo signal for converting the difference to target velocity, the comparing means coupled to the oscillator and second receiving means.

Other objects, advantages and novel features of the invention will become apparent from the following detailed description of the invention when considered in conjunction with the accompanying drawings wherein.

Figure 1:
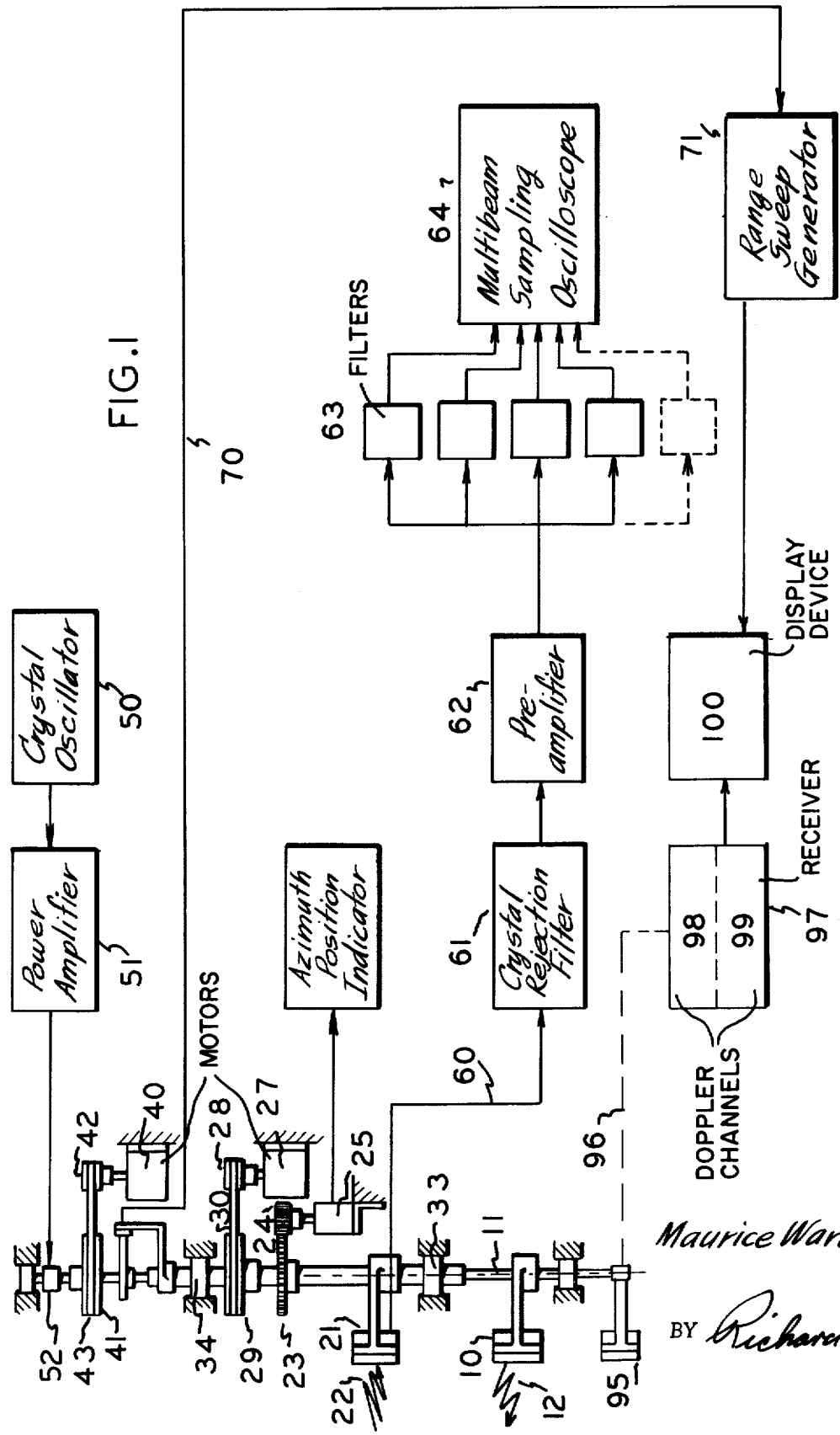
FIG. 1 is a general schematic showing one embodiment of the invention.
Figure 2:
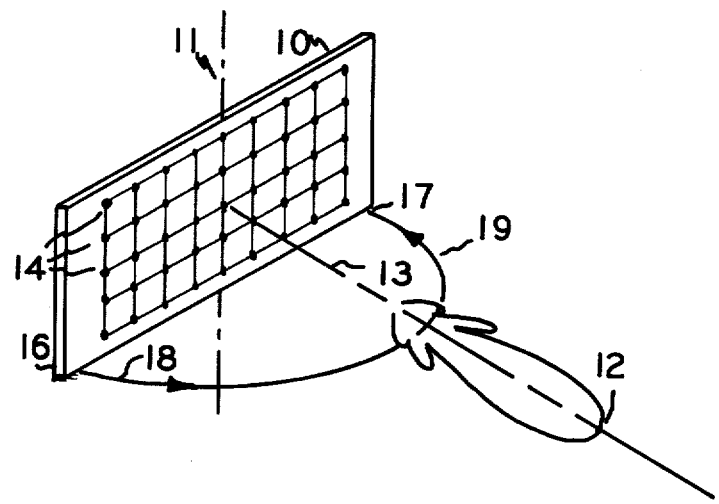
FIG. 2 shows the relative strength and directionality of the generated signal emitted by the transducer array.

In FIGS. 1 through 4 the transmitting sound transducer or transducer 10 is shown mounted about an axis 11, the strength of the output as any given instant is shown by the graphic presentation 12 in FIG. 2. This graphic presentation 12 indicates a major lobe along an axis 13 which is perpendicular or normal to the plane of the array of transducer 10. It should be noted that the small circles represent individual transducers 14 arranged such that the sum of their output is the presentation 12.

Any Doppler effects caused by the rotation of the transducer 10 because of the rotation of the individual transducers 14 located at positions 16, 17 are additive in a plus omega direction 18 and substract in the negative omega direction 19. That is, the velocity of the transducer reduces the wavelength of the generated signal in one direction and increases it in the other. This Doppler shift of individual elements is a basic phenomenon of the mechanism causing the lobe pattern of the array and the specific limitation on the spectral boundaries of the generated signal which permits the simultaneous measurement of range and velocity of a target.

FIG. 1 shows the transmitting transducer 10 mounted along axis 11 with the outgoing signal 12 designated as the jagged line. Co-axially mounted with the transmitting sound transducer is the receiver sound transducer 21 shown receiving a reflected return signal 22 whose composition will be described hereinafter. A first gear 23 drives a second gear 24 and is coupled to an indicator 25 for showing the direction of the first receiver transducer 21. A drive motor 27 coupled through pulleys 28 and 29, along with the drive belt 30 is mounted to rotate the receiver transducer 21, either continuously or to lock it in a given direction. Bearings 33 and 34 are provided to maintain the co-axial column that mounts the receiver and transmitter antennas 21 and 10. A second drive motor 40 is shown coupled through pulleys 41 and 42 and with drive belt 43 to rotate the transmitter transducer at a variety of speeds. A crystal oscillator 50 provides substantially pure sine wave at a given frequency, is fed to a power amplifier 51, coupled to a slip-ring 52, and to the transmitter transducer 10.

Figure 3:
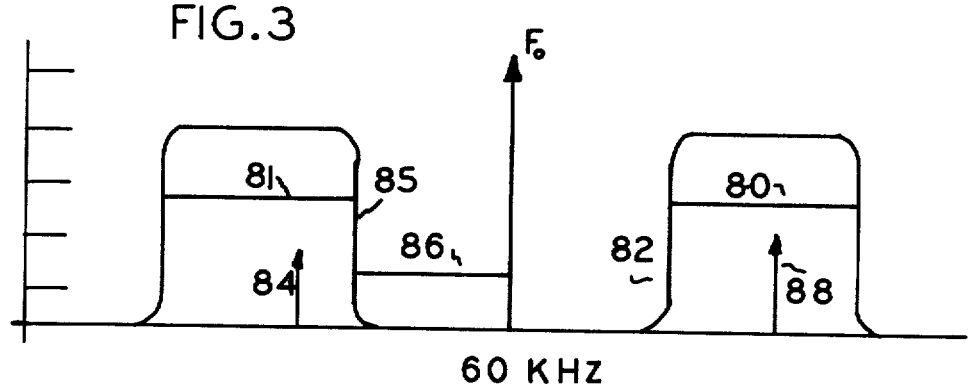
FIG. 3 shows the characteristics of the rejection filters available in one embodiment of the invention.

The return signal is shown coupled by a wire 60 to receive the signal from receiving sound transducer 21 which is fed through a crystal rejection filter 61 to a preamplifier 62 through a set of contiguous comb filters 63 acting as a spectrum analyzer to a multi-channel sampling oscilloscope 64. The crystal rejection filter 61 effectively eliminates unwanted frequencies in the pass band and it should be noted that in the filter set 63 there are provided at least first and second receiver channels with the designated pass band characteristics as shown in FIG. 3. Many such selective filters could be used if a variety of moving targets having different velocities are to be sampled.

A signal is coupled from the shaft position such that a synchronizing pulse is generated when sound transducers 95 and 10 are pointing at the same azimuth direction and fed on line 70 to the range sweep generator 71, hence to the display device 100 to initiate the start of the time measurement and consequently to indicate the range of targets along the azimuth bearing selected by the position of sound transducer 95. In one embodiment of invention the crystal oscillator frequency 50 was selected at 60 kHz, as shown in FIG. 3. The signal is designated as $F_0$. First and second passbands are provided by the Doppler filters 63, and they are designated as 80 and 81. These are at predetermined frequency bands above and below the generated frequency 86.

Assume for the moment that the transmitter and the receiver sound transducers are directed along a common bearing and that a pure 60,000 Hz signal is generated. As the signal goes out into the water at approximately 5,000 feet per second it encounters a target at some distance from the transmitter. If the target is moving towards the receiver transducer at a velocity of 2 miles per hour then it is equivalent to motion at 10,560 feet per hour or 2.93 feet per second. Since, by the Doppler principle, the wavelength of the reflected wave is shortened by approximately twice the equivalent velocity of the target in wavelength dimensions, the wavelength being about one inch, the frequency of the returned echo will be increased by 703 Hertz or to a frequency of 60,703 Hertz. This is referred to in this specification as "Up-Doppler" and is shown as arrow 88.

As shown in FIG. 3 the 60,703 Hertz signal falls in the upper pass band of the crystal selection filter 63 and therefore will be displayed upon the multi-channel sampling oscilloscope. The frequency spread between $F_0$ and the lower skirt 82 of the upper pass band is selected to discriminate against unwanted return frequencies in the return signal due to flowing water for example. In addition this space eliminates frequency increments due to the rotation of the sound transducer 10 as set forth above. If the target had been moving away from the receiving transducer then the signal would have fallen at 59,297 Hertz or a "Down-Doppler" of 703 Hertz. This is shown at the frequency appearing at the arrowed line 84. Again, the upper skirt of the pass band on the lower side, designated as 85, is a pre-selected distance from $F_0$, designated as 86, which can be varied to tune in or out certain areas of interest.

Figure 4:
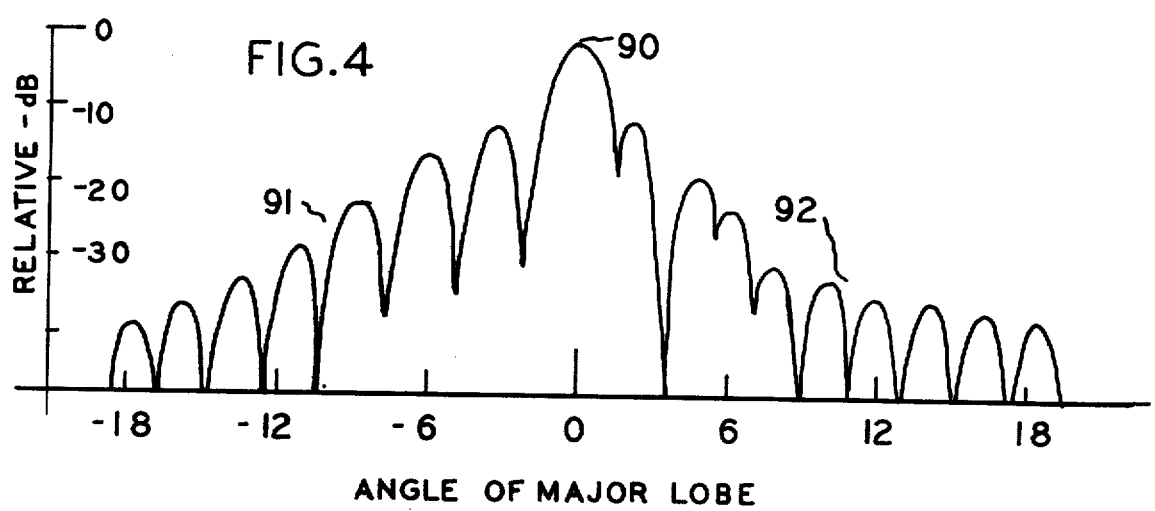
FIG. 4 shows the polar response of the rotating array.

If the transmitting transducer 10 is rotated and the receiving sound transducer 21 is rotated at a fixed angular bearing behind the transmitting transducer, then different operational characteristics exist. The transmitter sound transducer 10 will rotate as shown in FIG. 2 with the major lobe of the power output encountering the received target at some given time after the line or axis 13 no longer points toward the target. Reflection at the target will send back toward the sound transducer 21 a replica of the beam pattern or polar response of the sound transducer 10 such that the signal is delayed by the time required for a round trip in the water between the sonar and the target. If sound transducer 21 is rotating behind sound transducer 10 at the required angle and thus delayed by the exact amount desired then it will receive the echo from the target from along the proper bearing to the target. For a selected angle of delay between sound transducer 10 and sound transducer 21 and a fixed rotational speed the system will have maximum sensitivity only to those targets at a fixed range from the system. Sensitivity to other targets at different ranges will be reduced according to the designed directivity pattern of the two sound transducers multiplied together. A typical sensitivity pattern is represented by FIG. 4 where the first ambiguous sensitive lobe to each side of the primary lobe would have a response about 26 dB less than the primary sensitive band. Thus this mode of operation will search out an area at a selected range in a complete circle around the sonar. The bearing of the target is determined by the pointing direction of sound transducer 21 at the time of reception of the echo.

Another mode of operation is obtained with sound transducer 10 and 95 under the condition that 10 is rotating and 95 is pointed toward an azimuth bearing of interest. Sound transducer 95 is shown coupled by dashed line 96 to a second receiver 97 having third and fourth receiving channels 98, 99 and coupled to a display device 100. The means for rotating and directing the third sound transducer 95 would be mounted as on the other two sound transducers but are not shown for the sake of convenience. The response in FIG. 4 approximately represents the polar response of sound transducer 10 and, due to rotation, the time envelope response of a signal that might be reflected from a target located somewhere along the beam direction of sound transducer 95. The display coupled to sound transducer 95 is able to indicate range by means of the range sweep generator 71 which starts the time measurement at the moment that sound transducer 10 is pointing toward the target bearing and sends out the major lobe of its antenna pattern along the target azimuth. The echo returned to sound transducer 95 is delayed because of propagation velocity and the measurement of this delay permits the calculation of range to the target. The velocity of the target is indicated by noting which Doppler channel of receiver 97 has the largest signal. In this mode of operation it is possible to distinguish between different targets along the same bearing by virtue of their differences in range and velocity.

In all applications of this sonar system there is the rejection of all nonmoving targets and this provides a means of elimination of all forms of reverberation from the water, its surface and the bottom. It is well known that reflections from these unwanted areas form the major limitation in the use of sonar. Whenever there exists a suitable velocity component on the target the methods shown by this invention provide a great improvement in the discrimination of a target against a reverberation background, moreover at the same time retaining discrimination in range, bearing and velocity.

Since the sound transducers are on the same axis it is possible to reduce the sensitivity to nearby targets by selection of the vertical beam patterns. By either increasing the vertical directivity or by a greater separation of the sound transducers vertically on the axis the region of maximum sensitivity can be made to occur at a greater range. This tends to eliminate small Doppler effects that result from nearby small fish or flowing water.

By spreading the distance 86 further from the transmitted frequency $F_0$ it is possible to select the velocity of targets below and above which you do not wish to observe.

Additionally, it is possible to determine the characteristics of the target by the characteristic return of the signal. For example, a fish having a given method of motion through the water will generate a particular sound response which would designate it as a fish. Similarly a rowboat which would be observed going across the surface of the water in a like manner would have a characteristic response.

Obviously many modifications and variations of the present invention are possible in the light of the above teachings. It is therefore to be understood that within the scope of the appended claims the invention may be practiced otherwise than as specifically described.

I claim:

1. A system for acoustic echo ranging capable of measuring bearing range and velocity of moving targets; comprising:
   a. a first sound transducer rotatably mounted;
   b. a second transducer rotatably mounted, said first and second transducers forming a rotating directional acoustic array;
   c. a signal source for generating a first substantially pure sine wave signal coupled to said first sound transducer;
   d. a means for receiving and amplifying signal echoes of a given frequency above or below said first signal received from a moving target coupled to said second sound transducer;
   e. means for comparing the frequencies of the transmitted signal and the echo signal and converting the difference to target velocity, said means coupled to said signal source and said receiving means;
   f. means of measuring range on the said received signal by measuring the delay of the signal related to the rotation speed and position of said first rotating sound transducer; and
   g. means for producing a signal capable of both frequency resolution and time resolution using as a reference the rotating directional acoustic array.

2. The system of claim 1 wherein said first sound transducer is rotated at fixed selected speeds and the second sound transducer is directed toward a desired target.

3. The system of claim 2 wherein there is provided means coupled to said receiving sound transducer for displaying the returned echoes for maximum signal strength indicating the bearing, velocity and the range of the moving target.

4. The system of claim 1 wherein there is provided means coupled to said first and second rotatably mounted sound transducers for mounting them with a fixed angular displacement therebetween.

5. The system of claim 4 wherein there is provided means coupled to said receiving sound transducer for displaying the returned echoes for maximum signal strength indicating the bearing and velocity for a selected range.

6. The system of claim 4 wherein the means for receiving the signal echoes includes at least two channels having pass bands of a given width and of a given frequency individually above and below the generated sine wave frequency.

7. The system of claim 6 wherein said pass bands are adjustable with respect to said sine wave frequency and pass band having an extremely sharp cut-off points.

8. An improved moving target echo ranging system; comprising;
   a. first, second and third sound transducers co-axially mounted:
   b. first, second and third means for rotating said sound transducers coupled respectively to said first, second and third sound transducers;
   c. An oscillator for generating a substantially pure sine wave at a given frequency coupled to first of said sound transducers;
   d. A first receiver having first and second receiving channels individually having selected pass bands above and below said generated sine wave signal frequency said pass bands variable with respect to said generated sine wave signal, said receiver connected to said second sound transducer means;
   e. a second receiver having third and fourth receiving channels individually having selected pass bands above and below said generated signal said pass bands variable with respect to said generated signal, said second receiver connected to said third sound transducers;
   f. a first display means connected to said oscillator and to said first receiver to display the time of travel of the generated signal in water from said first sound transducer to a moving target and the reflected signal to said second sound transducer;
   g. a second display means connected to said oscillator and to said second receiver to display the echo signal intensity of a moving target received at said first sound transducer;
   h. means coupled to the rotating means for rotating said first and second sound transducer with a fixed angular displacement therebetween to receive at said second sound transducer reflected signals from a moving target between a minimum and maximum distance from said co-axial sound transducer array; and
   i. means for positioning said sound transducer on a given bearing towards a moving target coupled to said third rotating means, said target adding or subtracting a velocity component to the generated signal so that the reflected signal is at a higher or lower frequency by an amount relative to the motion of said target said reflected signal frequency being in the pass band of said first and third or second and fourth receiving channels.

* * * * *